United States Patent Office 3,071,966
Patented Jan. 8, 1963

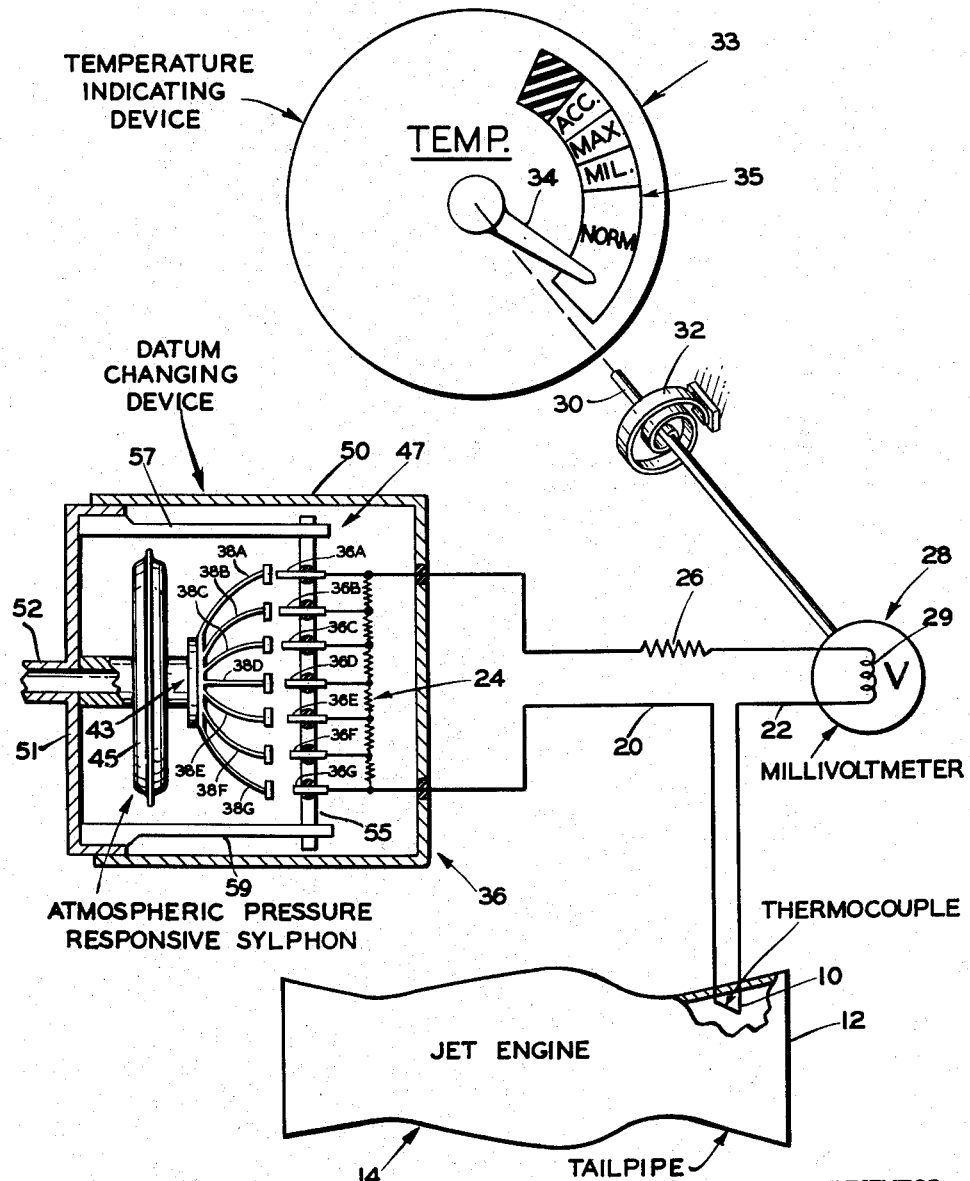

3,071,966
TEMPERATURE INDICATING DEVICE CORRECTED FOR ATMOSPHERIC PRESSURES AT DIFFERENT ALTITUDES
Donald F. Hastings, Suffern, N.Y., assignor to The Bendix Corporation, a corporation of Delaware
Filed Dec. 15, 1958, Ser. No. 780,511
6 Claims. (Cl. 73—345)

This invention relates to a temperature indicating device, including means to correct the device for changes in the atmospheric pressure at different altitudes and more particularly to a jet aircraft engine exhaust gas temperature sensitive device for indicating predetermined excessive temperature conditions prevailing at different altitudes of flight of the aircraft.

Jet aircraft engines usually have several rated levels of thrust such as "Normal," "Military," "Maximum" and "Accelerated" and for each of these thrust levels there is a corresponding level of exhaust gas or tail pipe temperature which is normal for the designed thrust value. A temperature indication over this predetermined normal value is generally a sign of a dangerously excessive temperature and trouble.

Moreover, as the prevailing altitude at which the aircraft is flying is increased with a corresponding decrease in the prevailing atmospheric pressure, somewhat higher tail pipe or engine exhaust gas temperatures are permissible and such sea level and altitude figures for the engine exhaust temperatures at rated thrust values are normally established by the engine manufacturer.

Engine instrumentation systems for jet aircraft engines normally include visual indicators showing engine thrust and exhaust gas temperature. Thrust is generally shown in precent and exhaust temperautre in degrees centigrade, but the aforedescribed rated levels may also be shown, and in some instances, other scale values may be omitted. At least one manufacturer has attempted to show on the dial of the exhaust gas temperautre indicator the established operating points at different altitudes which becomes a difficult scale to read with any degree of accuracy.

An object of the present invention is to provide novel means for automatically biasing the engine exhaust gas temperature reading so as to correct for varying altitude or atmospheric pressure conditions effecting the permissible exhaust gas temperature so that a scale may be used with only one scale reading cooperating with the indicator pointer at each operating point regardless of the flight altitude of the aircraft.

Moreover, inasmuch as the permissible exhaust gas temperature is a function of the altitude of the aircraft or prevailing atmospheric pressure at the level of flight, it is an object of the invention to provide a novel atmospheric pressure responsive mechanism or altimeter to control a variable resistor means in series with an engine exhaust gas temperature responsive meter circuit to bias the temperature reading so that the indicated tail pipe temperature will be corrected approximately for the changes in the altitude of the aircraft or prevailing atmospheric pressure.

Thus in the device of the present invention only one temperature indicator scale would be required in cooperation with a temperature operated meter pointer to visually provide the desired temperature information to the pilot under the varying altitude flight conditions. Such arrangement increases the readability of the temperature indicator and eliminates the need of a mental correction by the pilot of a true indicated exhaust gas temperature as in the case of prior devices.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

The drawing is a diagrammatic showing of the invention.

Referring to the drawing, there is indicated by numeral 10 a thermocouple located in the tail pipe 12 of a jet aircraft engine 14 and responsive to the temperature of the exhaust gases from the engine.

The thermocouple 10 is operatively connected by lines 20 and 22 through a variable resistor 24 and a calibrating resistor 26 to a millivoltmeter 28 of conventional type. The millivoltmeter 28 includes an operating coil 29, a shaft 30 and a coiled hairspring 32 on the shaft 30 operatively connecting the meter 28 to an indicator 33. The hairspring 32 biases the shaft 30 and an indicator pointer 34 in a clockwise direction. A voltage proportional to the temperature of the exhaust gases in the tail pipe 12 is generated by the thermocouple 10 located in the tail pipe 12 of the jet engine 14. The thus generated voltage is applied through lines 20 and 22 to the operating coil 29 of the millivoltmeter 28 which in turn causes the shaft 30 and indicator pointer 34 to be biased in a counterclockwise direction in opposition to the biasing force of the hairspring 32.

The indicator pointer 34 is arranged so as to cooperate with an indicator scale 35 on the indicator 33 and bearing the indicated ranges "Norm." for Normal range; "Mil." for Military range; "Max." for Maximum range; and "Acc." for Accelerated range, while the cross hatched section indicates the excessive range under any given altitude condition.

The "Normal" range refers to an engine temperature range permissible during the cruising speed of the jet aircraft; the "Military" range refers to an engine temperature range permissible during military maneuvers as under combat conditions while the "Maximum" range refers to a maximum allowable engine temperature range. The "Accelerated" range refers to an engine temperature range which may be permissible above the "Maximum" for only short periods of time specified by the manufacturer of the particular engine in operation. Under applicable rules and regulations, it is incumbent upon the operator on returning to the aircraft base to report any operation of the engine within the "Accelerated" range whereupon engine inspection is mandatory to determine if any damage may have resulted to the engine from such high operating temperatures and which might require replacement or overhaul of the engine. The cross hatched section refers to a temperature range of operation of the jet aircraft engine which is prohibited as excessive. Moreover, under applicable rules and regulations in the event of an operation of the engine within the prohibited temperature range, it is incumbent upon the operator to report such operation upon return to the aircraft base whereupon it is mandatory that the engine be replaced as no longer fit for safe operation.

A control device 36 is arranged to automatically bias the meter 28 operating the pointer 34 so as to correct for varying altitude and permit the simple scale 35 to be utilized at different altitudes or atmospheric pressures. The control device 36 includes a variable resistor 24 having adjustable contacts 36A–G cooperating with switch arms 38A–G of a contact spider 43 so as to selectively engage in sequential order the respective contacts to vary the effective resistance of the element 24 with changes in the prevailing altitude or atmospheric pressure.

The spider 43 is controlled by a Sylphon bellows 45 responsive to the prevailing atmospheric pressure and positioned in an evacuated chamber 47 within a casing 50 fitting in sealing relation about a base member 51 of the control device.

The interior of the bellows 50 is connected by a conduit 52 with the atmospheric pressure at the level of flight of the aircraft, as indicated diagrammatically in the drawing. Thus as the level of flight of the aircraft increases with a corresponding decrease in the effective atmospheric pressure the Sylphon bellows 45 tends to collapse moving the spider 43 and switch arms 38A–G so as to selectively open one or more of the contacts 36A–G to effect an increase in the resistance of the resistor element 24 while upon the level of flight of the aircraft decreasing with a corresponding increase in the effective atmospheric pressure the Sylphon bellows 45 tends to expand moving the switch arms 38A–G so as to selectively close one or more of the contacts 36A–G so as to shunt portions of the resistor element 24 to decrease the resistance thereof.

The several contacts 36A–G are adjustably mounted in an electrical insulator member 55 carried by post 57 and post 59 supported by the base member 51. Thus the atmospheric pressure responsive bellows 45 and spider 43 carrying the switch contact arms 38A–G cooperating with the several contacts 36A–G may vary the resistance 24 in a predetermined manner so that the effective voltage from the thermocouple 10 acting on the millivoltmeter 28 is varied with changes in the altitude of the aircraft engine 14 so as to correct the range indicated on the scale 35 by the indicator pointer 34 for varying altitude or atmospheric pressure conditions.

Thus under varying altitude conditions there may be used the scale 35 with a single scale reading in cooperative relation with the pointer 34 operated by the meter 28 in response to the voltage output of the engine exhaust gas temperature responsive thermocouple 10 as modified by the atmoshperic pressure responsive control device 36.

Moreover, by making the resistor element 24 variable and controlled by the atmospheric pressure responsive bellows 45 through the spider 43 and switch arms 38A–G in cooperative relation with the variable resistor contacts 36A–G a predetermined modification of the temperature signal supplied the meter 28 may be readily obtained with changes in the prevailing atmospheric pressure or altitude. Thus corrections in the rated operating ranges of the indicator 33 may be readily obtained, correcting the rated operating ranges for changes in altitude and eliminating the necessity of the pilot making such corrections mentally or the use of a complicated dial presentation.

The control device 36 thus provides a novel means for changing the datum or temperature setting of the indicator 33 with change in the prevailing atmospheric pressure or altitude of the aircraft in flight so that the aforenoted indicating ranges of the indicator 33 may be readily obtained.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. For use in an aircraft having a jet engine, means for indicating temperatures of the engine exhaust gas within predetermined ranges designated for different conditions of operation of the engine and which ranges vary with the prevailing altitude of the aircraft; said means comprising a device for sensing the temperature of the exhaust gas and having an electrical energy output proportional thereto, electrical energy responsive motive means, electrical circuit means for operably connecting the electrical energy output of said device to the energy responsive means, means for varying said circuit means including a variable resistance device, and an atmospheric pressure responsive element operably connected to the variable resistance device in such a manner as to vary the resistance thereof in the predetermined relation to the variations in the prevailing altitude of the aircraft, an indicator scale having serially arranged thereon a designated normal temperature range, a designated temperature range for military maneuver, a designated maximum allowable temperature range, a designated temperature range for accelerated engine operation, and a designated excessive temperature range, a pointer movable relative to said indicator scale and in a cooperative relation therewith, said energy responsive motive means being operable to position the pointer relative to the indicator scale in such a manner as to indicate thereon at different altitudes of flight of the aircraft the designated range of the prevailing engine exhaust gas temperature.

2. The combination defined by claim 1 in which said circuit varying means comprises a variable resistor element having a series of switch contacts leading therefrom, a spider element having a plurality of switch arms for selectively opening and closing said switch contacts in a predetermined relation, and an atmospheric pressure responsive device to operably position the spider element and thereby the switch arms so as to selectively close said switch contacts to decrease the resistance of the resistor element upon an increase in the atmospheric pressure and to selectively open the switch contacts to increase the resistance of the resistor element upon a decrease in the atmospheric pressure, and the resistance of said resistor element being thereby varied in a predetermined relation to the variations in the prevailing altitude of the aircraft.

3. For use in an aircraft having a jet engine, means for indicating temperatures of the engine exhaust gas within predetermined ranges designated for different conditions of operation of the engine and which ranges vary with the prevailing altitude of the aircraft; said means comprising a thermocouple for sensing the temperature of the exhaust gas and having an electrical energy output proportional thereto, a millivoltmeter, electrical circuit means for operably connecting the electrical energy output of said thermocouple to the millivoltmeter, said circuit means including a variable resistor element having a series of switch contacts leading therefrom, a spider element having a plurality of switch arms for selectively opening and closing said switch contacts in a predetermined relation, an atmospheric pressure responsive device to operably position the spider element and thereby the switch arms so as to selectively close said switch contacts to decrease the resistance of the resistor element upon an increase in the atmospheric pressure and to selectively open the switch contacts to increase the resistance of the resistor element upon a decrease in the atmospheric pressure, the resistance of said resistor element being thereby varied in a predetermined relation to the variations in the prevailing atmospheric pressure during the flight of the aircraft, said millivoltmeter including an indicator scale having serially arranged thereon a designated normal temperature range, a designated temperature range for military maneuver, a designated maximum allowable temperature range, a designated temperature range for accelerated engine operation, and a designated excessive temperature range, a pointer movable relative to said indicator scale and in a cooperative relation therewith, and said millivoltmeter being operable to position the pointer relative to the indicator scale in such a manner as to indicate thereon at different altitudes of flight of the aircraft the designated range of the prevailing engine exhaust gas temperature.

4. For use in an aircraft having a jet engine, means for indicating temperatures of the engine exhaust gas within predetermined ranges designated for different conditions of operation of the engine and which ranges vary with the prevailing altitude of the aircraft; said means comprising a device for sensing the temperature of the exhaust gas, means for indicating the predetermined designated range of the then effective engine exhaust gas temperature, means for operably connecting the temperature sensing device to the indicating means, and means responsive to a change in the altitude of the aircraft for varying the datum of the indicating means.

5. For use in an aircraft having a jet engine, means for indicating temperatures of the engine exhaust gas within predetermined ranges designated for different conditions of operation of the engine and which ranges vary with the prevailing altitude of the aircraft; said means comprising a device for sensing the temperature of the exhaust gas, means for indicating the predetermined designated range of the then effective engine exhaust gas temperature, means for operably connecting the temperature sensing device to the indicating means, and means responsive to the atmospheric pressure at the prevailing altitude of the aircraft for changing the datum of the indicating means.

6. For use in an aircraft having a jet engine, means for indicating temperatures of the engine exhaust gas within predetermined ranges designated for different conditions of operation of the engine and which ranges vary with the prevailing altitude of the aircraft, said means comprising a device for sensing the temperature of the engine exhaust gas, means for indicating the predetermined designated range of the then effective engine exhaust gas temperature, means responsive to the atmospheric pressure at the prevailing altitude of the aircraft for changing the datum of the indicating means, and said datum changing means operably connecting the temperature sensing device to the indicating means.

References Cited in the file of this patent

UNITED STATES PATENTS

| | | |
|---|---|---|
| 2,091,848 | Eggers | Aug. 31, 1937 |
| 2,598,790 | Harrison | June 3, 1952 |
| 2,622,393 | Edwards et al. | Dec. 23, 1952 |
| 2,648,194 | Jorgensen | Aug. 11, 1953 |
| 2,705,047 | Williams et al. | Mar. 29, 1955 |
| 2,764,247 | Bevins | May 22, 1956 |